(12) United States Patent
Yang et al.

(10) Patent No.: US 12,032,614 B2
(45) Date of Patent: Jul. 9, 2024

(54) MULTICLASS CLASSIFICATION WITH DIVERSIFIED PRECISION AND RECALL WEIGHTINGS

(71) Applicant: Ancestry.com Operations Inc., Lehi, UT (US)

(72) Inventors: Yingrui Yang, San Mateo, CA (US); Peng Jiang, Sunnyvale, CA (US); Christopher Miller, San Francisco, CA (US); Azadeh Moghtaderi, San Francisco, CA (US)

(73) Assignee: Ancestry.com Operations Inc., Lehi, UT (US)

( * ) Notice: Subject to any disclaimer, the term of this patent is extended or adjusted under 35 U.S.C. 154(b) by 540 days.

(21) Appl. No.: 17/175,070

(22) Filed: Feb. 12, 2021

(65) Prior Publication Data

US 2021/0256324 A1   Aug. 19, 2021

Related U.S. Application Data

(60) Provisional application No. 62/976,799, filed on Feb. 14, 2020.

(51) Int. Cl.
*G06F 16/35* (2019.01)
*G06F 18/2415* (2023.01)
*G06N 3/049* (2023.01)
*G06N 20/00* (2019.01)

(52) U.S. Cl.
CPC ........ *G06F 16/353* (2019.01); *G06F 18/2415* (2023.01); *G06N 3/049* (2013.01); *G06N 20/00* (2019.01)

(58) Field of Classification Search
CPC ... G06F 16/353; G06F 18/2415; G06N 3/049; G06N 20/00
See application file for complete search history.

(56) References Cited

U.S. PATENT DOCUMENTS

| 11,416,713 B1* | 8/2022 | Bala ....................... G06N 5/025 |
| 2019/0066185 A1* | 2/2019 | More ....................... G06N 7/01 |
| 2021/0044697 A1* | 2/2021 | Khafizov .............. G06F 18/285 |

OTHER PUBLICATIONS

Van Asch, Vincent, "Macro-and Micro Averaged Evaluation Measures", 2013, Basic Draft.
Opitz, et. al., "Macro F1 and Macro F1", arXiv preprint arXiv:1911.03347 (2019).

(Continued)

*Primary Examiner* — Jianxun Yang
(74) *Attorney, Agent, or Firm* — Keller Preece PLLC

(57) ABSTRACT

Described herein are systems, methods, and other techniques for evaluating a classifier model. The classifier model may be provided with a set of elements to be classified into N classes. Classification results may be obtained from the classifier model. N class-specific precisions and N class-specific recalls for the N classes may be computed based on the classification results. N class-specific precision weights and N class-specific recall weights corresponding to the N classes may be obtained. A weighted f-measure may be computed by weighting the N class-specific precisions with the N class-specific precision weights and weighting the N class-specific recalls with the N class-specific recall weights.

20 Claims, 10 Drawing Sheets

(56) References Cited

OTHER PUBLICATIONS

Espindola, R.P., et al.: II On Extending F-Measure and G-mean Metrics to Multi-class Problems, WIT Transactions on Information and Communication Technologies, vol. 35, 2005, XP055798581, Retrieved from the Internet: URL:https://www.witpress.com/elibrary/wit-transactions-on-information-and-conmunication-technologies/35/14987[retrieved on Apr. 23, 2021], the whole document.
International Search Report and Written Opinion mailed May 10, 2021 in related application No. PCT/US2021/017903, all pgs.

\* cited by examiner

FIG. 3

| Model | Micro-f | Macro-f | Weighted F-Measure | |
|---|---|---|---|---|
| | | | default | $1.1^n$ |
| Char-Word LSTM | 0.723 | 0.410 | 0.403 | 0.581 |
| ELMo-1 | 0.732 | 0.537 | 0.592 | 0.581 |
| ELMo-2 | 0.730 | 0.527 | 0.575 | 0.594 |

FIG. 8

MULTICLASS CLASSIFICATION WITH DIVERSIFIED PRECISION AND RECALL WEIGHTINGS

CROSS-REFERENCES TO RELATED APPLICATIONS

This application claims the benefit of priority to U.S. Provisional Patent Application No. 62/976,799, filed Feb. 14, 2020, entitled "WEIGHTED F-MEASURE FOR MULTICLASS-CLASSIFICATION WITH SPECIFIC PRECISION AND RECALL REQUIREMENTS," the entire content of which is incorporated herein by reference for all purposes.

BACKGROUND OF THE INVENTION

Precision and recall are two important metrics for measuring the quality of a binary classifier. Precision generally refers to the proportion of positive identifications that were actually correct, while recall generally refers to the proportion of actual positives that were correctly identified. Formulaically, if TP, FP, and FN correspond to the quantities of true positives, false positives, and false negatives, respectively, then precision, P, and recall, R, can be expressed as follows:

$$P = \frac{TP}{TP + FP} \quad (1)$$

$$R = \frac{TP}{TP + FN} \quad (2)$$

Since neither of these metrics alone fully captures the performance of a binary classifier, it is common to compute a harmonic mean of the precision and recall, a value referred to as the $f_1$ score, which can be expressed as follows:

$$f_1 = \left(\frac{P^{-1} + R^{-1}}{2}\right)^{-1} \quad (3)$$

In some cases, a weighted harmonic mean of the precision and recall can be computed. For any unevenly distributed weight, this metric is called an f-measure, which can be denoted as $f_{\alpha,\beta}$ and expressed as follows:

$$f_{\alpha,\beta} = \left(\frac{\alpha \cdot P^{-1} + \beta \cdot R^{-1}}{\alpha + \beta}\right)^{-1} \quad (4)$$

where $\alpha$ and $\beta$ are weights.

While combining precision and recall for a binary classifier is straightforward, there are a number of approaches to the multiclass classification problem, many of which do not adequately capture the performance of multiclass classifiers. As such, there is a need for new techniques for evaluating multiclass classifiers.

BRIEF SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method of evaluating a classifier model, the method comprising: providing the classifier model with a set of elements to be classified into N classes; obtaining results from the classifier model based on the classifier model classifying the set of elements into the N classes; computing N class-specific precisions and N class-specific recalls for the N classes based on the results; obtaining N class-specific precision weights and N class-specific recall weights corresponding to the N classes, wherein one or both of the N class-specific precision weights or N class-specific recall weights are nonuniform; computing a weighted f-measure by weighting the N class-specific precisions with the N class-specific precision weights and weighting the N class-specific recalls with the N class-specific recall weights.

Example 2 is the computer-implemented method of example(s) 1, wherein N is greater than or equal to three.

Example 3 is the computer-implemented method of example(s) 1-2, wherein computing the N class-specific precisions and the N class-specific recalls for the N classes based on the results includes: counting a number of true positives in the results; counting a number of false positives in the results; and counting a number of false negatives in the results.

Example 4 is the computer-implemented method of example(s) 1-3, wherein each of the N class-specific precision weights and each of the N class-specific recall weights is greater than or equal to one.

Example 5 is the computer-implemented method of example(s) 1-4, wherein the set of elements include text, image, video, or audio data elements.

Example 6 is the computer-implemented method of example(s) 1-5, wherein the classifier model is a machine learning (ML) model.

Example 7 is the computer-implemented method of example(s) 1-6, wherein the classifier model is a long short-term memory (LSTM) network.

Example 8 is a non-transitory computer-readable medium comprising instructions that, when executed by one or more processors, cause the one or more processors to perform operations comprising: providing a classifier model with a set of elements to be classified into N classes; obtaining results from the classifier model based on the classifier model classifying the set of elements into the N classes; computing N class-specific precisions and N class-specific recalls for the N classes based on the results; obtaining N class-specific precision weights and N class-specific recall weights corresponding to the N classes, wherein one or both of the N class-specific precision weights or N class-specific recall weights are nonuniform; computing a weighted f-measure by weighting the N class-specific precisions with the N class-specific precision weights and weighting the N class-specific recalls with the N class-specific recall weights.

Example 9 is the non-transitory computer-readable medium of example(s) 8, wherein N is greater than or equal to three.

Example 10 is the non-transitory computer-readable medium of example(s) 8-9, wherein computing the N class-specific precisions and the N class-specific recalls for the N classes based on the results includes: counting a number of true positives in the results; counting a number of false positives in the results; and counting a number of false negatives in the results.

Example 11 is the non-transitory computer-readable medium of example(s) 8-10, wherein each of the N class-specific precision weights and each of the N class-specific recall weights is greater than or equal to one.

Example 12 is the non-transitory computer-readable medium of example(s) 8-11, wherein the set of elements include text, image, video, or audio data elements.

Example 13 is the non-transitory computer-readable medium of example(s) 8-12, wherein the classifier model is a machine learning (ML) model.

Example 14 is the non-transitory computer-readable medium of example(s) 8-13, wherein the classifier model is a long short-term memory (LSTM) network.

Example 15 is a system comprising: one or more processors; and a computer-readable medium comprising instructions that, when executed by the one or more processors, cause the one or more processors to perform operations comprising: providing a classifier model with a set of elements to be classified into N classes; obtaining results from the classifier model based on the classifier model classifying the set of elements into the N classes; computing N class-specific precisions and N class-specific recalls for the N classes based on the results; obtaining N class-specific precision weights and N class-specific recall weights corresponding to the N classes, wherein one or both of the N class-specific precision weights or N class-specific recall weights are nonuniform; computing a weighted f-measure by weighting the N class-specific precisions with the N class-specific precision weights and weighting the N class-specific recalls with the N class-specific recall weights.

Example 16 is the system of example(s) 15, wherein N is greater than or equal to three.

Example 17 is the system of example(s) 15-16, wherein computing the N class-specific precisions and the N class-specific recalls for the N classes based on the results includes: counting a number of true positives in the results; counting a number of false positives in the results; and counting a number of false negatives in the results.

Example 18 is the system of example(s) 15-17, wherein each of the N class-specific precision weights and each of the N class-specific recall weights is greater than or equal to one.

Example 19 is the system of example(s) 15-18, wherein the set of elements include text, image, video, or audio data elements.

Example 20 is the system of example(s) 15-19, wherein the classifier model is a machine learning (ML) model.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 3 illustrates an example pair of confusion matrices.

FIG. 8 illustrates a table that shows model performance.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Multiclass classification is a common goal in many data science applications, and as such has yielded many popular metrics to evaluate its use. While many of these metrics take into account precision and recall, none of them allow for weighting these two quantities. In many cases, it may be desirable that a classifier exhibits high precision in one particular class and high recall in another, different class. For example, in the case of diagnosing a disease, a valuable classifier may have high recall of dangerous diseases, and high precision when treatment involves a risky procedure.

Embodiments of the present disclosure relate to a new metric for measuring the performance of multiclass classifiers that allows for the assignment of variable importance to the precision and recall of each of the classes. This metric is a significant improvement to thefl score that is defined on binary classifiers, as well as to other techniques such as micro- and macro-averaging. In particular, one can select coefficients that weight the per-class precision and recall, as well as the overall class importance, with a robust mathematical interpretation. The efficacy of this metric is demonstrated on an application in genealogical search. It is shown that the proposed metric offers flexibility around users' specific requirements on per-class precision and recall.

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1:
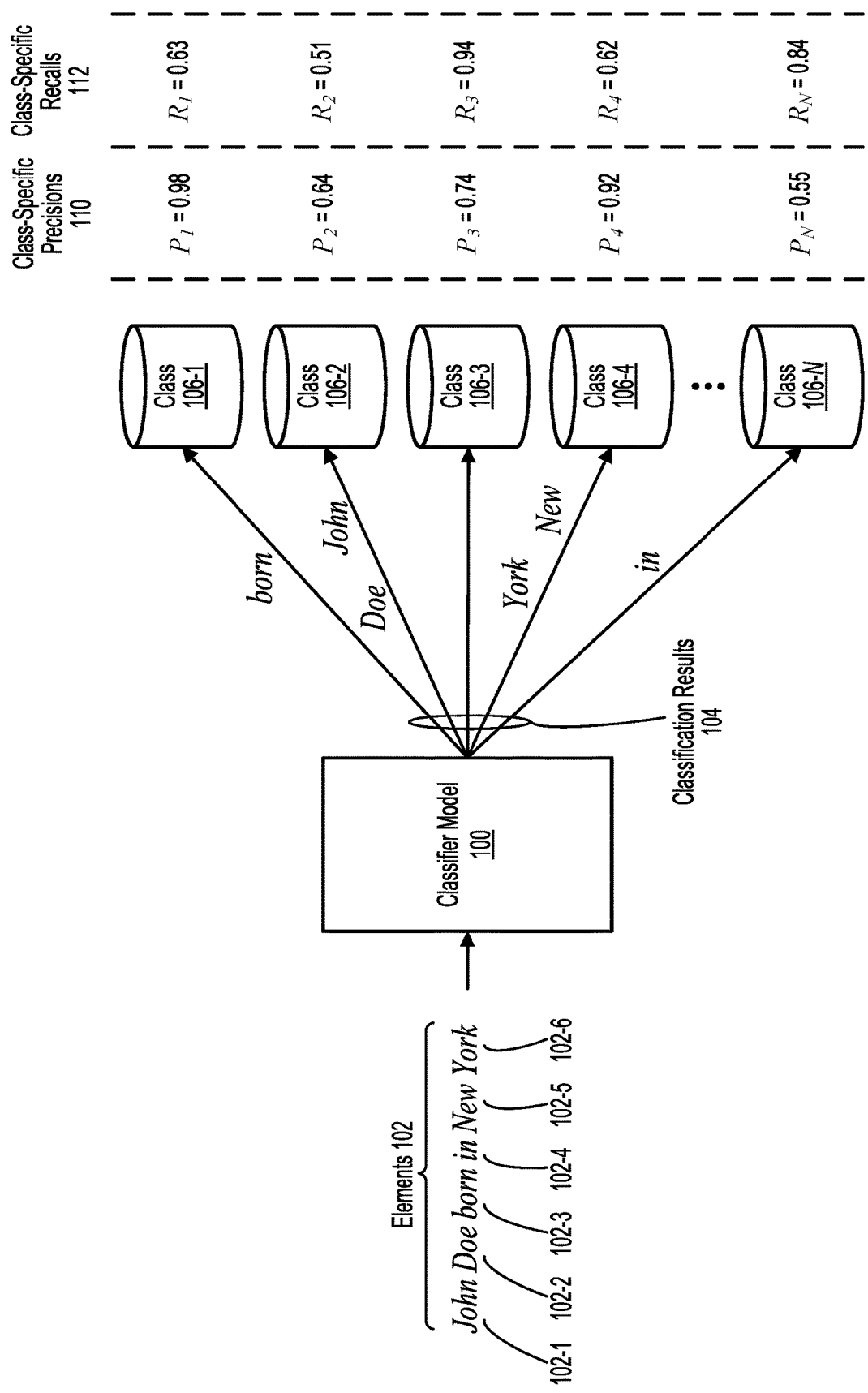
FIG. 1 illustrates a classifier model that classifies elements into classes.

FIG. 1 illustrates a classifier model 100 that classifies elements 102 into classes 106. In some embodiments, classifier 100 classifies each of elements 102 into one of N classes 106. However, other classification schemes in which a single element is classified into multiple classes and/or a group of elements (e.g., two or three elements) are classified together into one or more classes are contemplated and are considered to be within the scope of the present disclosure. Furthermore, one or more of classes 106 may include sub-classes that provide further specificity with respect to a particular class. In various embodiments, elements 102 may include text data, image data, video data, audio data, among other possibilities.

In the illustrated example, classifier model 100 is provided with elements 102 consisting of the text "John Doe born in New York", with each word of the text being one of elements 102. Upon receiving elements 102, classifier model 100 classifies "John" and "Doe" into class 106-2 (which may be a class for names), "born" into class 106-1 (which may be a class for verbs), "New" and "York" into class 106-4 (which may be a class for places), and "in" into class 106-N(which may be a class for prepositions). Such classifications may be referred to as classification results 104.

Classifier model 100 can be evaluated by computing its precision and recall. Since classifier model 100 is a multiclass classifier, the precision and recall of classifier model 100 can be computed on a class-by-class basis in the form of class-specific precisions 110 (alternatively denoted as $P_1$, $P_2$, ..., $P_N$) and class-specific recalls 112 (alternatively denoted as $R_1$, $R_2$, ..., $R_N$), respectively. In some instances, a generalization of the f-measure is derived by considering a multiclass classifier with N classes instead as N one-versus-all binary classifiers. That is, the ith binary classifier predicts whether the object belongs to the ith class. Some of these generalizations, along with their shortcomings, are described below.

One approach is micro-averaging, which is calculated at the level of confusion matrices. In some instances, the micro-averaged precision, recall and f-measure may be the same and equal to the overall accuracy of the classifier. Accuracy can be an especially poor metric in the case of imbalanced data.

Another approach is macro-averaging, which can be carried out at either the level of precision and recall, or at the level of the f-measure. If $P_i$ denotes the precision of the ith class, then the macro-averaged precision (macro-Precision) is defined by:

$$\text{macro-Precision} = \frac{\sum_i P_i}{n} \tag{5}$$

and the macro-averaged recall is defined similarly.

The macro-averaged f-measure has two variants. The first is simply the harmonic mean of the macro-precision and the macro-recall. The second (macro-f) is calculated by:

$$\text{macro-}f_i = \frac{\sum_i w_i f_1^{(i)}}{\sum_i w_i} \tag{6}$$

where $f_1^{(i)}$ is the $f_1$ score calculated for class i. Both of the macro-averaged measures treat all classes equally, meaning that coefficients have to be specifically selected when dealing with class imbalance. Neither allows for unequal weighting of the precision and recall within a class.

Embodiments of the present disclosure relate to a new definition, referred to as the weighted f-measure and denoted as $f_{\vec{\alpha},\vec{\beta}}$ that generalizes the f-measure to multiclass models. Letting $P_i$ and $R_i$ refer to the precision and recall of the ith one-vs-all classifier, the weighted f-measure is expressed as follows:

$$f_{\vec{\alpha},\vec{\beta}} = \left( \frac{\sum_i \alpha_i (P_i)^{-1} + \sum_i \beta_i (R_i)^{-1}}{\sum_i \alpha_i + \sum_i \beta_i} \right)^{-1} \tag{7}$$

where $\vec{\alpha}$ ($\alpha_1$, $\alpha_2$, ..., $\alpha_N$) and $\vec{\beta}$ ($\beta_1$, $\beta_2$, ..., $\beta_N$) are vectors of nonnegative real numbers referred to as class-specific precision weights and class-specific recall weights, respectively. In some embodiments, the weighted f-measure $f_{\vec{\alpha},\vec{\beta}}$ is a weighted harmonic mean of all of the precisions and recalls. Intuitively, $\alpha_i$ can be assigned to a large value if it is desirable for the metric to be sensitive to changes in the precision of the ith classifier. Similarly, a large value for $\beta_i$ would describe a metric that is impacted by small perturbations in the ith recall.

In some embodiments, if one lets $\vec{\alpha} = \vec{\beta} = \vec{e}_i$, where $\vec{e}_i$ is the ith standard unit vector, then $f_{\vec{\alpha},\vec{\beta}} = f_1^{(i)}$, the $f_1$ score of the ith class. In this way, $f_{\vec{\alpha},\vec{\beta}}$ can be used as a generalization of the one-vs-all binary classifier. Moreover, it can be shown that $$f_{\vec{\alpha},\vec{\beta}} = \left( \frac{\sum_i (\alpha_i + \beta_i)(f_{\alpha_i,\beta_i}^{(i)})^{-1}}{\sum_i \alpha_i + \sum_i \beta_i} \right)^{-1} \tag{8}$$

where $f_{\alpha_i,\beta_i}^{(i)}$ is the weighted f-measure of the ith class. Equation 8 is the weighted harmonic mean of the f-measures of each class. This provides two different perspectives on the score $f_{\vec{\alpha},\vec{\beta}}$: as a weighted harmonic mean of per-class f-measures, or as a weighted harmonic mean of the precisions and recalls. In some implementations, the former formulation may be preferred as it allows a more direct comparison of the importance of the precisions and recalls.

Figure 2:
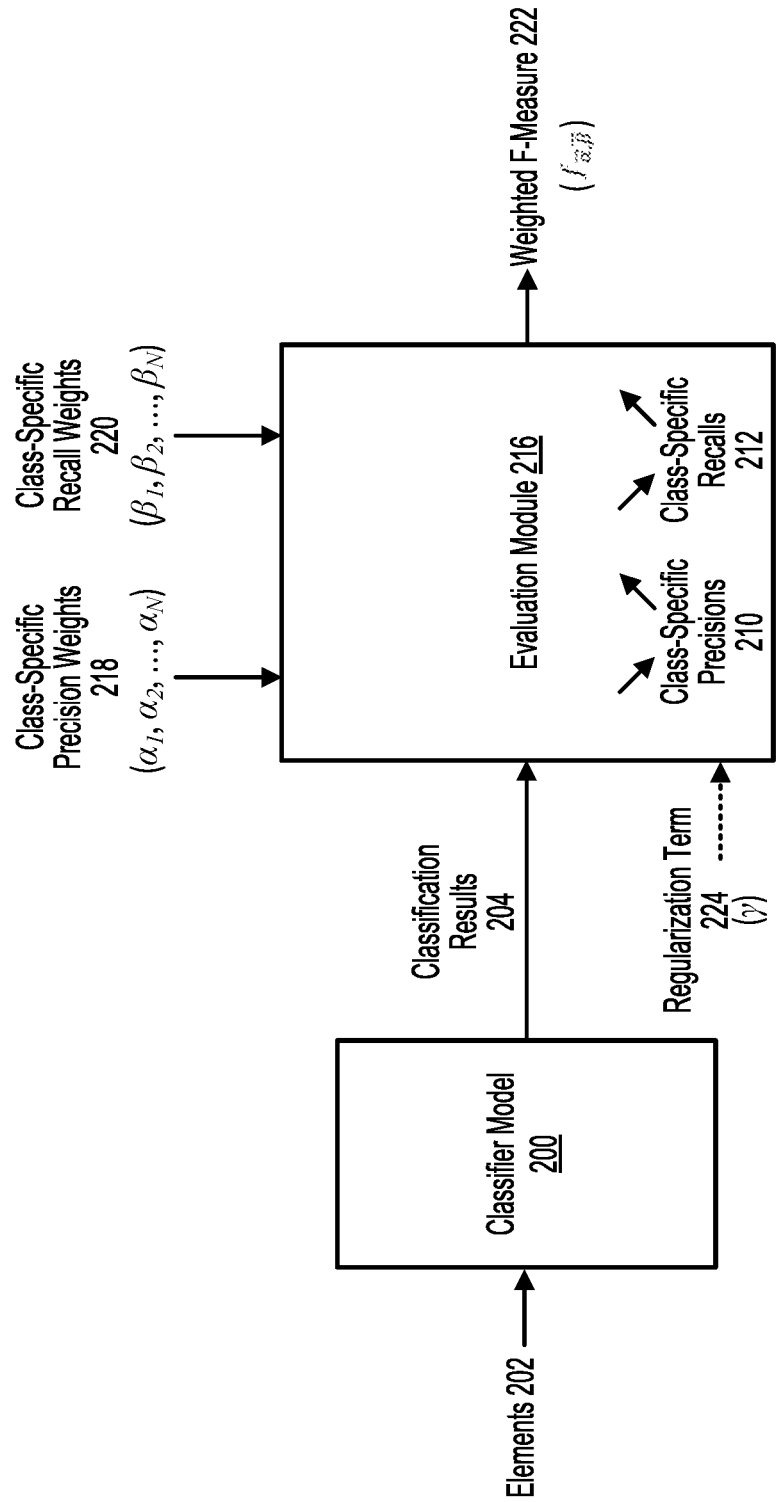
FIG. 2 illustrates an example evaluation of a classifier model.

FIG. 2 illustrates an example evaluation of a classifier model 200 by an evaluation model 216, according to some embodiments of the present disclosure. In the illustrated example, classifier model 200 is provided with elements 202 to be classified into one of N classes. Classifier model 200 then generates classification results 204, which includes the classifications of elements 202 into the N classes. Evaluation module 216 obtains classification results 204 and computes class-specific precisions 210 and class-specific recalls 212 based on classification results 204. Evaluation module 216 then obtains class-specific precision weights 218 and class-specific recall weights 220, and may optionally obtain a regularization term 224. Evaluation module 216 then computes a weighted f-measure 222 based on class-specific precisions 210, class-specific recalls 212, class-specific precision weights 218, class-specific recall weights 220, and optionally regularization term 224.

Figure 3:
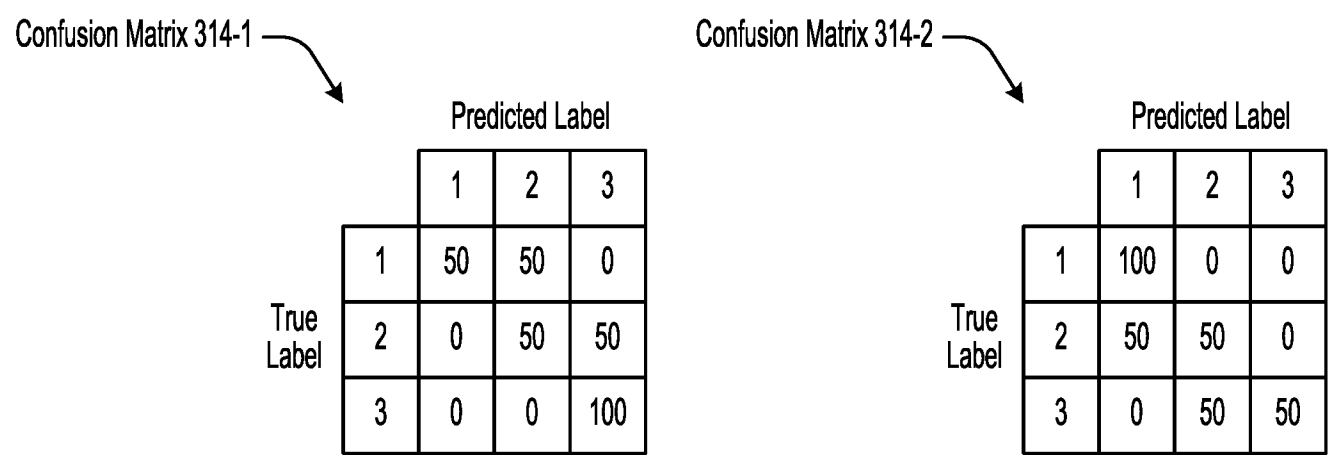

FIG. 3 illustrates an example pair of confusion matrices 314 that may be used to demonstrate how the weighted f-measure can analyze different classifiers, according to some embodiments of the present disclosure. Confusion matrix 314-1 shows the results of a first classifier model attempting to classify 150 different elements into three different classes and confusion matrix 314-2 shows the results of a second classifier model doing the same. Using macro-averaged precisions and recalls, confusion matrices 314 have the same calculated scores. Further calculations can show that confusion matrices 314 yield the same macro-averaged precisions and recalls. They also have the same scores for both variants of the macro-averaged f-measure and all micro-averaged statistics. As such, by all standard metrics, the performance of these two models is the same.

Suppose now that these classes actually correspond to variants of a disease, and that the variant of the disease is being predicted based on some test. The third variant of the disease is deadly, so it is desirable to recall all of the true positives in that case. However, the treatment for the first variant is also very dangerous, so it is desirable to be very precise with the predictions of that class. Therefore, one is searching for a model that has high precision on the first class, and has high recall on the third class. In this case, the first confusion matrix clearly outperforms the second. This is reflected by the performance on the weighted f-measure metric $f_{\vec{\alpha},\vec{\beta}}$ where $\vec{a}=(v, 1, 1)$, $\vec{\beta}(=(1, 1, v)$ and $v>1$. Setting $v=1.1^3$ (a choice that will be motivated later), the first model gets a score of 0.656 while the second gets a score of 0.625. The difference in these scores would be even more drastic if $v$ were selected to be greater than $1.1^3$.

Figure 4:
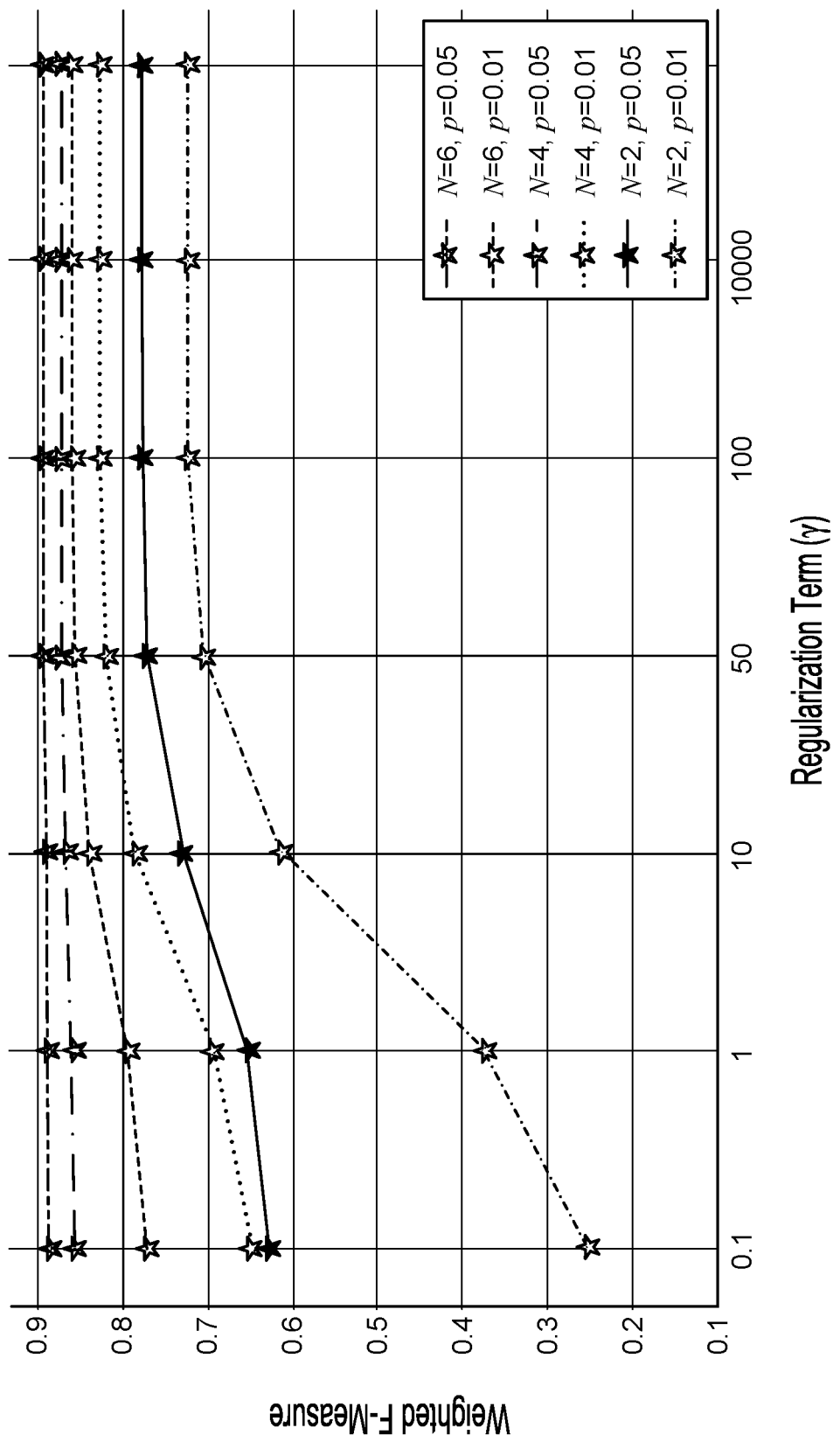
FIG. 4 illustrates an example plot showing the effect a regularization term on a weighted f-measure.

FIG. 4 illustrates an example plot showing the effect a regularization term $\gamma$ on the weighted f-measure, according to some embodiments of the present disclosure. In some instances, harmonic means are both smaller and more impacted by their smallest summand than arithmetic means. From equation 8, it can be shown that, in some instances, $f_{\vec{\alpha},\vec{\beta}}$ is a harmonic mean of f-measures. Since macro-averaging involves an arithmetic mean, it can be shown that $f_{\vec{\alpha},\vec{\beta}}$ will be smaller than the macro-averaged f-measure using the same weights. In other words, $f_{\vec{\alpha},\vec{\beta}}$ will tend towards the f-measure of the worst-performing class. This fact is potentially useful: if one desires the performance of their model to be above some threshold for all classes, then $f_{\vec{\alpha},\vec{\beta}}$ is a good choice.

In practice, one is often presented with highly imbalanced data. If one of these classes has very few members, then its f-measure depends on the classification of only a few data points, which presents potentially unstable $f_{\vec{\alpha},\vec{\beta}}$ values, especially if the model is poorly performing on this class. These fluctuations can be combated by inserting a regularization term $\gamma$ as follows:

$$f^{\gamma}_{\vec{\alpha},\vec{\beta}} = \left( \frac{\sum_i \alpha_i (Prcision_i + \gamma)^{-1} + \sum_i \beta_i (\text{Recall}_i + \gamma)^{-1}}{\sum_i \alpha_i + \sum_i \beta_i} \right)^{-1} - \gamma \quad (9)$$

As $\gamma$ becomes larger, so do the numbers being averaged. If none of the numbers are near zero, then they do not blow up when inverted. That causes the metric to be more stable to perturbations in the smallest precisions and recalls. It can be observed that, as $\gamma$ becomes large, the harmonic mean tends towards more middling values, instead of towards the minimum. In fact, a limit is taken as $\gamma$ approaches infinity, it can be observed that:

$$\lim_{\gamma \to \infty} f^{\gamma}_{\vec{\alpha},\vec{\beta}} = \frac{\sum_i \alpha_i \text{Precision}_i + \sum_i \beta_i \text{Recall}_i}{\sum_i \alpha_i + \sum_i \beta_i} \quad (10)$$

The arithmetic mean of these quantities is much more robust to small changes in the precision or recall. With this in mind, $\gamma$ can be thought of as both a regularizer and a sparsity coefficient: large values of $\gamma$ push the metric towards the arithmetic mean, which is advantageous if there is a class with very few data points.

The coefficients $\alpha_i$ and $\beta_i$ reflect the weights associated with the precision and recall of class i. The ratio of these weights indicates a willingness to exchange a small amount of precision for a small amount of recall, or vice-versa, when $$\frac{\alpha_i}{\beta_j} = \left(\frac{P_i}{R_j}\right)^2$$

is achieved. One could rely on domain experience to choose the weights based on the application needs, but there may be cases when requirements are not strong. For example, an application may demand high precision in a first class, but may not have specific requirements of how much preference should be given. For cases like these, it may be desirable to first assign equal weights to precision and recall metrics in every class, and then add an exponential growth factor to the term that it may be desirable to emphasize. Reasonable choices may be values slighter larger than 1, such as 1.1, or 1.15, etc.

To choose the value for regularization parameter $\gamma$, there are two potential factors, the number of classes and the degree of imbalance of the data. In theory, if the smallest class is sparse, a larger $\gamma$ is preferred to reduce randomness in the metric. As described below, a rule of thumb can be arrived at using a simulation analysis.

Six scenarios were simulated with a fixed sample size of 1,000 and an accuracy of 90%. The number of classes (N) was either 2, 4 or 6, the size of smallest class (p) being 0.01 or 0.05 of the population. For each scenario, the N by N confusion matrix of a model was simulated 1,000 times. The correctly predicted data points and the incorrectly predicted points were sampled into each cell of the confusion matrix following some fixed probability using a hypergeometric distribution and multinomial distribution. The mean and the [2.5%, 97.5%] percentiles of the weighted f scores are shown in FIG. 4. Based on the results, it may be concluded that the more imbalanced the data was, the larger variance the weighted f-measure had. Higher number of classes will tend to have more stable weighted f scores. In general, if one has limited knowledge of the data, $\gamma=100$ can serve as a rule of thumb.

Figure 5:
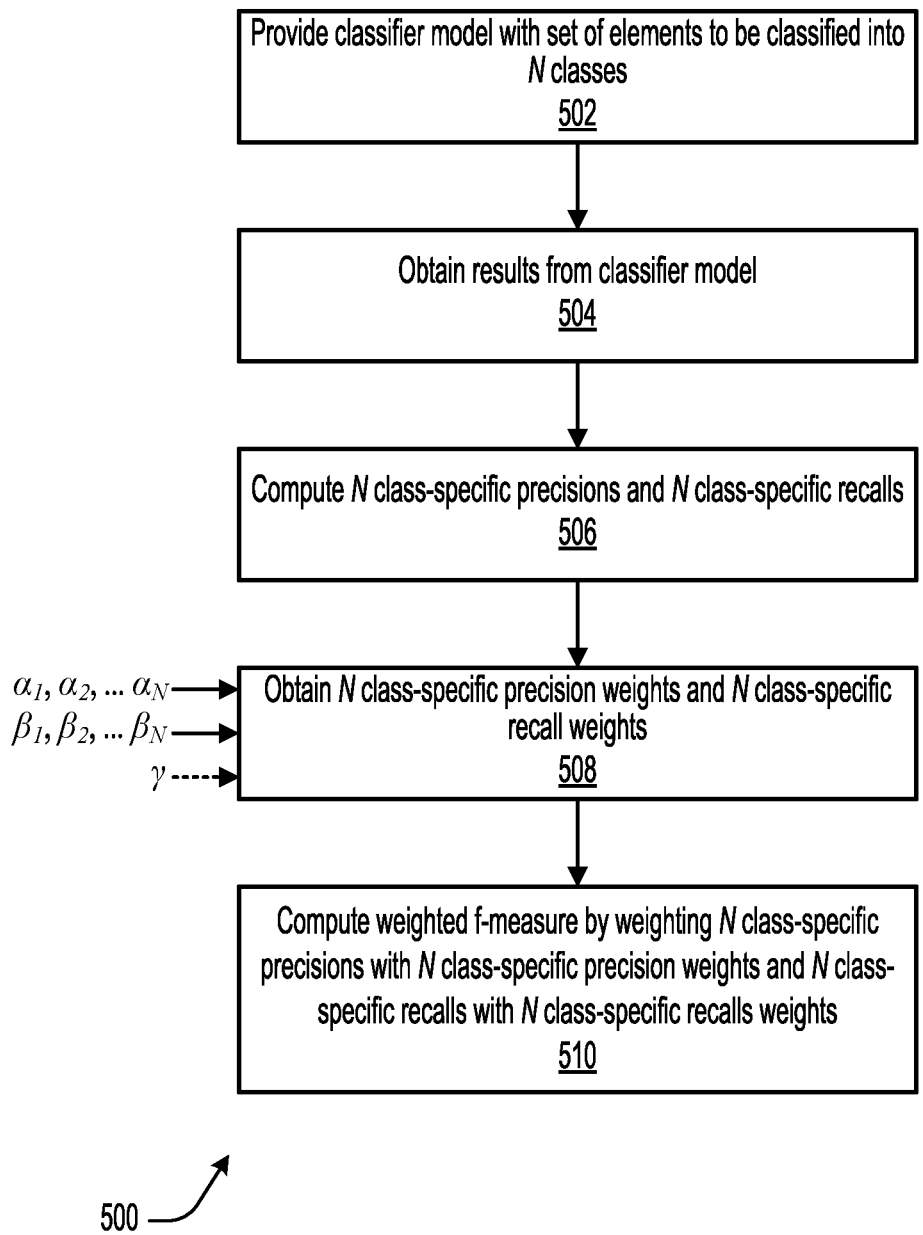
FIG. 5 illustrates a method of evaluating a classifier model.

FIG. 5 illustrates a method 500 of evaluating a classifier model, according to some embodiments of the present disclosure. One or more steps of method 500 may be omitted during performance of method 500, and steps of method 500 may be performed in any order and/or in parallel. One or more steps of method 500 may be performed by one or more processors. Method 500 may be implemented as a computer-readable medium or computer program product comprising instructions which, when the program is executed by one or more computers, cause the one or more computers to carry out the steps of method 500.

At step 502, a classifier model (e.g., classifier models 100, 200) is provided with a set of elements (e.g., elements 102, 202) to be classified into N classes (e.g., classes 106). The classifier model may be a multiclass classifier. For example, the number of classes N may be greater than or equal to three. The set of elements may include text data, image data, video data, audio data, among other possibilities.

At step 504, results (e.g., classification results 104, 204) are obtained from the classifier model based on the classifier model classifying the set of elements into the N classes. The results may include one or more confusion matrices (e.g., confusion matrices 314). The results may include indications of which of the N classes that each of the set of elements was classified into as well as which of the N classes that each of the set of elements belongs to (or should have been classified into). For example, the results may include a true label and a predicted label for each of the set of elements, where the true label is one of the N classes and the predicted label is one of the N classes.

At step 506, N class-specific precisions (e.g., class-specific precisions 110, 210 or $P_1, P_2, \ldots P_N$) and N class-specific recalls (e.g., class-specific recalls 112, 212 or $R_1, R_2, \ldots R_N$) are computed for the N classes based on the results. The N class-specific precisions may each be computed using equation 1. The N class-specific recalls may each be computed using equation 2.

At step 508, N class-specific precision weights (e.g., class-specific precision weights 218 or $\alpha_1, \alpha_2, \ldots \alpha_N$) and N class-specific recall weights (e.g., class-specific recall weights 220 or $\beta_1, \beta_2, \ldots \beta_N$) are obtained. The N class-specific precision weights may correspond to and may be applied to the N class-specific precisions, and the N class-specific recall weights may correspond to and may be applied to the N class-specific recalls. The N class-specific precision weights and the N class-specific recall weights may be received from a user via a user interface or may be generated by a processor, among other possibilities. Optionally, 508 may include obtaining a regularization term (e.g., regularization term 224 or $\gamma$).

In some embodiments, one or both of the N class-specific precision weights and the N class-specific recall weights may be nonuniform. For example, in some embodiments, the N class-specific precision weights may be nonuniform, where at least one of the N class-specific precision weights may be different than at least one other of the N class-specific precision weights (e.g., $\alpha_1=1.1^3, \alpha_2=1, \alpha_3=1$). As another example, in some embodiments, the N class-specific recall weights may be nonuniform, where at least one of the N class-specific recall weights may be different than at least one other of the N class-specific recall weights (e.g., $\beta_1=1, \beta_2=1.1^3, \beta_3=1$).

At step 510, a weighted f-measure (e.g., weighted f-measure 222 or $f_{\vec{\alpha},\vec{\beta}}$) is computed by weighting the N class-specific precisions with the N class-specific precision weights and weighting the N class-specific recalls with the N class-specific recall weights. In some embodiments, weighting the N class-specific precisions with the N class-specific precision weights may include multiplying or dividing each of the N class-specific precisions with/by a respective class-specific precision weight from the N class-specific precision weights. In some embodiments, weighting the N class-specific recalls with the N class-specific recall weights may include multiplying or dividing each of the N class-specific recalls with/by a respective class-specific recall weight from the N class-specific precision recalls. The weighted f-measure may be computed using equations 7, 8, or 9, among other possibilities. Optionally, the weighted f-measure may be computed based on the regularization term.

Figure 6:
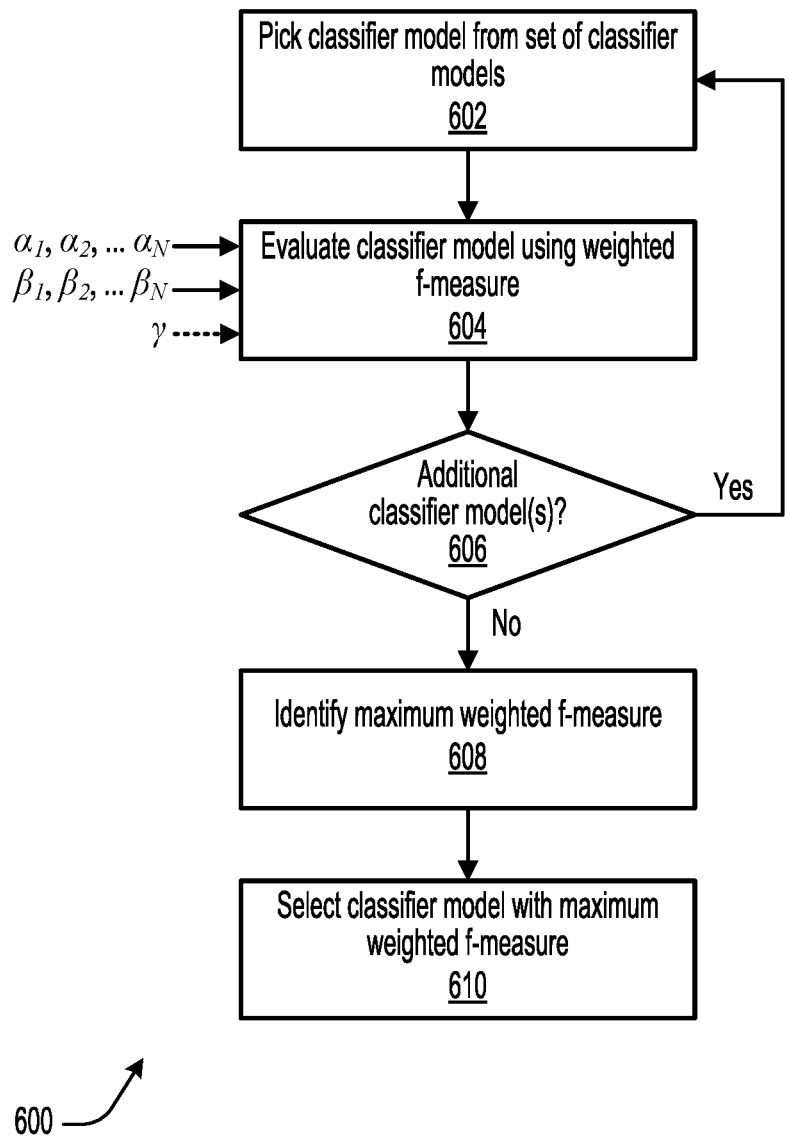
FIG. 6 illustrates a method of selecting a classifier model.

FIG. 6 illustrates a method 600 of selecting a classifier model, according to some embodiments of the present disclosure. One or more steps of method 600 may be omitted during performance of method 600, and steps of method 600 may be performed in any order and/or in parallel. One or more steps of method 600 may be performed by one or more processors. Method 600 may be implemented as a computer-readable medium or computer program product comprising instructions which, when the program is executed by one or more computers, cause the one or more computers to carry out the steps of method 600.

At step 602, a classifier model (e.g., classifier models 100, 200) is picked from a set of classifier models. All of the set of classifier models may be multiclass classifiers.

At step 604, the classifier model is evaluated using a weighted f-measure (e.g., weighted f-measure 222 or $f_{\vec{\alpha},\vec{\beta}}$). In some embodiments, step 604 may include performing method 500 for the classifier model, with the same N class-specific precision weights, the same N class-specific recall weights, and the same regularization term being used for each of the set of classifier models. As such, step 604 may include computing the weighted f-measure for the classifier model based on N class-specific precision weights (e.g., class-specific precision weights 218 or $\alpha_1, \alpha_2, \ldots \alpha_N$), N class-specific recall weights (e.g., class-specific recall weights 220 or $\beta_1, \beta_2, \ldots \beta_N$), and (optionally) a regularization term (e.g., regularization term 224 or $\gamma$).

At step 606, it is determined whether there are additional classifier model(s) in the set of classifier models that have not yet been picked. If there are additional classifier model(s), method 600 returns to step 602 and another classifier model is picked. If there are no additional classifier model(s), method 600 proceeds to step 608.

At step 608, a maximum weighted f-measure is identified from a plurality of weighted f-measures computed in step 604.

At step 610, the classifier model from the set of classifier models corresponding to the maximum weighted f-measure is selected and is used for a multiclass classification application. In some embodiments, an indication of the selected classifier model may be outputted.

Figure 7:
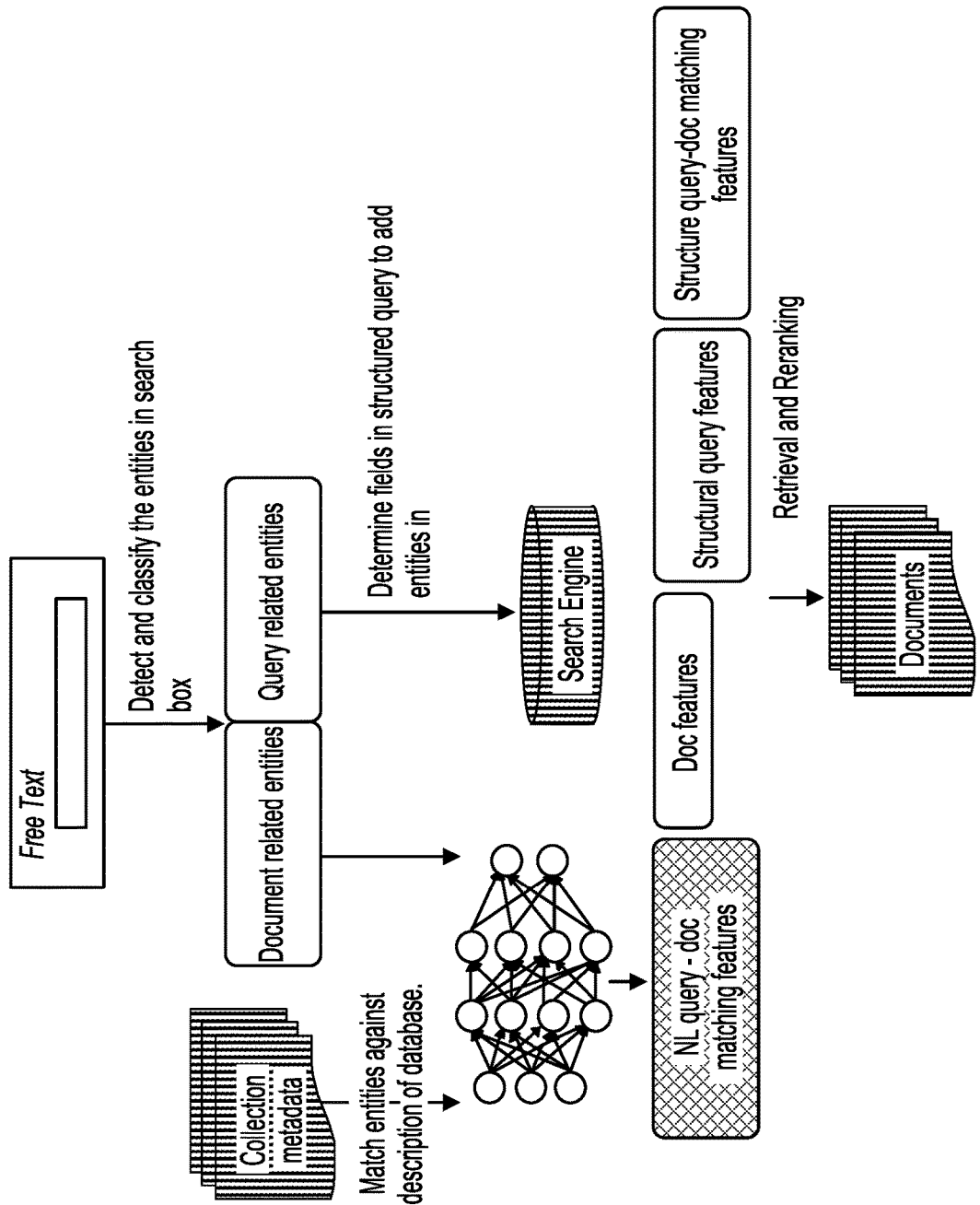
FIG. 7 illustrates an example search process.

FIG. 7 illustrates an example search process that utilizes various aspects of the present disclosure. In some instances, a structured query may consist of two parts, a form-based structured sub-query with one field for each entity, and a free-form text field capturing things not covered in the form. In a traditional search engine, the keyword is treated the same way as a field in the form. However, in a real-world search engine, users often treat the free-text field as an unstructured web search field, putting things belonging to the form into the keyword field. In this case, analyzing and understanding the keyword field can play an important role in search relevancy.

In order to understand the content in the free-text field, a pipeline first has a model to classify the keywords into different categories. After query disambiguation, a query reformation component may be used to update the form part in the query, which may be followed by a retrieval and ranking component to collect the final search results.

Among all the categories, some correspond to specific fields in the form and some correspond to the user's preference for certain content. The multiclass classifier categorizes the information in a keyword field into one category. As shown in FIG. 7, if the category is form-related, the information in the keyword will be used for query reformation. One example would be if married to John Smith is seen in the keyword field, then one would want to add John Smith into the Spouse Name field in the form. Otherwise, the keyword will be used to match against the meta-information of the record collections. For example, a keyword military draft may be used to match against the record types of all the records and a military record may have a high matching score for this query. One may call the matching score a natural language (NL) query-doc matching feature, and this feature can be used in retrieval and ranking of search results.

Different categories receive different treatment downstream, which naturally leads to different precision and recall requirements for the categories. The keywords classified into a form-related category (such as a name) are used to reform the query. For these categories, it may be desirable for the model to have high precision as the fields in the form are the most important information to match against the records. A wrong last name in the form could completely mess up the search results. For keywords related to the content, such as military draft, high recall is desirable. It may be desirable to identify as many true positives as possible since the cost of a false positive is small.

Two classification models were used in a case study, and the difference between their weighted f-measures is shown as an example. The text to be classified comprised of mostly short phrases with one to three words, many of which are names, street addresses and occupations. To capture the syntactic relationship in the text, a unidirectional LSTM model was trained with a bidirectional character-level LSTM layer. It is used since names, locations and street addresses are uncommon words in a corpus. At the word level, a unidirectional LSTM was used due to the fact that most of the texts in the dataset are short phrases. This unidirectional LSTM may also be referred to herein as the char-word LSTM.

Classifying unstructured text is a commonly seen and well-defined problem. There have been a number of breakthroughs in the field of natural language processing (NLP), more specifically neural language models (NLM), in the past few years that allows performance of text classification with improved accuracy. Transfer learning with pre-trained embeddings and models enables knowledge transfer across different NLP tasks, providing a schema for fast training on a reasonably sized training data. Popular pre-trained model for transfer learning task in NLP include feature based models such as Embeddings from Language Models (ELMo), fine-tuning pretrained models such as Open AI's GPT-2 transformer and Bidirectional Encoder Representations (BERT). ELMo was used since it is more efficient in training as the pretrained embedding can be used directly as a feature compared to fine-tuning models.

The data consisted of around 12,000 samples of the keyword field from the search query logs of a major genealogy search engine. With the help of labeling experts, the texts were classified into one of 15 categories such as, name, location, occupation, record type, collection description, historical events, personal description, relationship etc. The average number of words in the texts was 1.93. 95% of the texts have in between one to six words and the median number of the characters in the text is 10. The data was also imbalanced: 80% of the data fell into three categories.

As some of the categories were extremely sparse (fewer than 20 samples in 12,000 data points), noise was reduced by removing the data points in those categories, resulting in nine categories in total. The dataset was still imbalanced in that the smallest category had just 34 data points. Among the nine categories, three categories were things to be filled into the form, for which high precision was desired, while one category was used to generate NL query-doc matching features, for which high recall was desired. The training and testing data was split to be ⅔ and ⅓.

The first model that was used was a char-word level LSTM. The dimensions of the last two dense layers were 256 and 9 respectively. The second model that was used was a pretrained ELMo from tensorflow hub. The last 4 scalar weights were retrained and a dense layer with dimension 256 was added. The loss function was the categorical cross entropy. This model is also referred to herein as ELMo-1. The last model (ELMo-2) was a pretrained ELMo with fixed scalar weights. Other settings were the same as the second model.

FIG. 8 illustrates a table 800 that shows model performance with respect to micro-f-measure, macro-f-measure and the weighted f-measure under different coefficient settings. $\gamma$ was set to be 100 for both scenarios. The $\alpha$, $\beta$ values for the default weighted-f were all set to 1. In the second scenario, the $\alpha$, $\beta$ values for the categories for which there was a preference were set to $1.1^N$ to emphasize those groups while taking into account of the number of classes N. For the rest of the categories, the $\alpha$, $\beta$ coefficients were kept as 1.

Based on the model performance numbers shown in table 800, it was observed that the two ELMo models performed better than char-word LSTM on all metrics. To choose between ELMo-1 and ELMo-2, given the fact that the micro f-measure and macro f-measure were similar, the weighted f-measure was used. Under the setting with $\alpha=\beta=1.1^N$, ELMo-2 performed better than ELMo-1.

Figure 9:
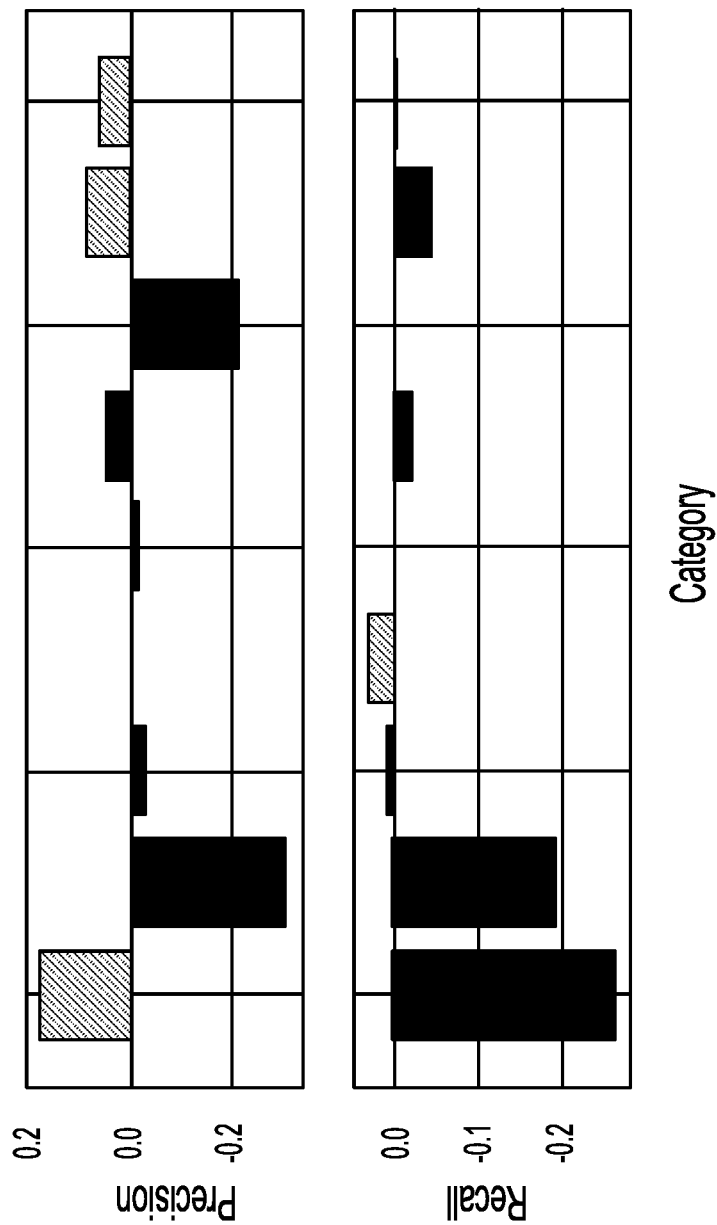
FIG. 9 illustrates plots that show the relative precision and recall improvements of the ELMo-2 model compared to the ELMo-1 model.

FIG. 9 illustrates two plots that show the relative precision improvement (upper plot) and relative recall improvement (lower plot) of ELMo-2 compared to ELMo-1. The bars with lighter shadings indicate the classes with a precision/recall preference, i.e., three different classes had a precision preference and one class had a recall preference. Based on the results shown in FIGS. 8 and 9, it can be observed that EMLo-2 is the best-performing model that should be used for this particular application. Furthermore, these results demonstrate that the proposed metric was able to pick out the best-performing model whereas the conventional metrics were insufficient.

Figure 10:
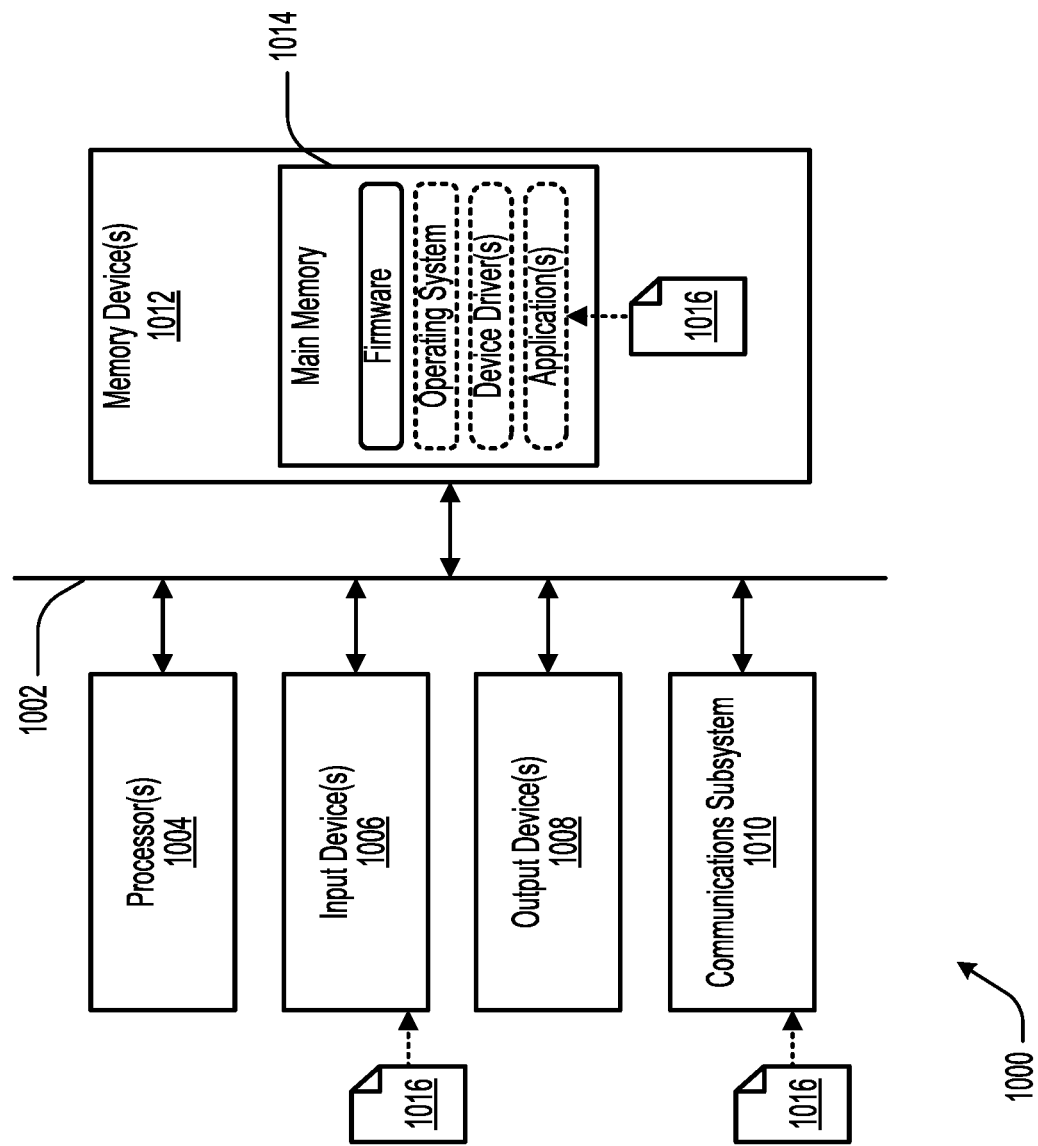
FIG. 10 illustrates an example computer system comprising various hardware elements.

FIG. 10 illustrates an example computer system 1000 comprising various hardware elements, according to some embodiments of the present disclosure. Computer system 1000 may be incorporated into or integrated with devices described herein and/or may be configured to perform some or all of the steps of the methods provided by various embodiments. For example, in various embodiments, computer system 1000 may be configured to perform methods 500 or 600. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

In the illustrated example, computer system 1000 includes a communication medium 1002, one or more processor(s) 1004, one or more input device(s) 1006, one or more output device(s) 1008, a communications subsystem 1010, and one or more memory device(s) 1012. Computer system 1000 may be implemented using various hardware implementations and embedded system technologies. For example, one or more elements of computer system 1000 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 1000 may be coupled via communication medium 1002. While communication medium 1002 is illustrated as a single connection for purposes of clarity, it should be understood that communication medium 1002 may include various numbers and types of communication media for transferring data between hardware elements. For example, communication medium 1002 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1002 may include one or more buses connecting pins of the hardware elements of computer system 1000. For example, communication medium 1002 may include a bus connecting processor(s) 1004 with main memory 1014, referred to as a system bus, and a bus connecting main memory 1014 with input device(s) 1006 or output device(s) 1008, referred to as an expansion bus. The system bus may consist of several elements, including an address bus, a data bus, and a control bus. The address bus may carry a memory address from processor(s) 1004 to the address bus circuitry associated with main memory 1014 in order for the data bus to access and carry the data contained at the memory address back to processor(s) 1004. The control bus may carry commands from processor(s) 1004 and return status signals from main memory 1014. Each bus may include multiple wires for carrying multiple bits of information and each bus may support serial or parallel transmission of data.

Processor(s) 1004 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 1004 may include one or more multi-core processors, in which each core may read and execute program instructions simultaneously with the other cores.

Input device(s) 1006 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 1006 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1008 may include one or more of various devices that convert information into human-readable form, such as without limitation a display device, a speaker, a printer, and/or the like. Output device(s) 1008 may also include devices for writing to removable storage devices or other removable media, such as those described in reference to input device(s) 1006. Output device(s) 1008 may also include various actuators for causing physical movement of one or more components. Such actuators may be hydraulic, pneumatic, electric, and may be provided with control signals by computer system 1000.

Communications subsystem 1010 may include hardware components for connecting computer system 1000 to systems or devices that are located external computer system 1000, such as over a computer network. In various embodiments, communications subsystem 1010 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1012 may include the various data storage devices of computer system 1000. For example, memory device(s) 1012 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 1004 and memory device(s) 1012 are illustrated as being separate elements, it should be understood that processor(s) 1004 may include varying levels of on-processor memory, such as processor registers and caches that may be utilized by a single processor or shared between multiple processors.

Memory device(s) 1012 may include main memory 1014, which may be directly accessible by processor(s) 1004 via the memory bus of communication medium 1002. For example, processor(s) 1004 may continuously read and execute instructions stored in main memory 1014. As such, various software elements may be loaded into main memory 1014 to be read and executed by processor(s) 1004 as illustrated in FIG. 10. Typically, main memory 1014 is volatile memory, which loses all data when power is turned off and accordingly needs power to preserve stored data. Main memory 1014 may further include a small portion of non-volatile memory containing software (e.g., firmware, such as BIOS) that is used for reading other software stored in memory device(s) 1012 into main memory 1014. In some embodiments, the volatile memory of main memory 1014 is implemented as random-access memory (RAM), such as dynamic RAM (DRAM), and the non-volatile memory of main memory 1014 is implemented as read-only memory (ROM), such as flash memory, erasable programmable read-only memory (EPROM), or electrically erasable programmable read-only memory (EEPROM).

Computer system 1000 may include software elements, shown as being currently located within main memory 1014, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 1016, executable by computer system 1000. In one example, such instructions 1016 may be received by computer system 1000 using communications subsystem 1010 (e.g., via a wireless or wired signal carrying instructions 1016), carried by communication medium 1002 to memory device(s) 1012, stored within memory device(s) 1012, read into main memory 1014, and executed by processor(s) 1004 to perform one or more steps of the described methods. In another example, instructions 1016 may be received by computer system 1000 using input device(s) 1006 (e.g., via a reader for removable media), carried by communication medium 1002 to memory device(s) 1012, stored within memory device(s) 1012, read into main memory 1014, and executed by processor(s) 1004 to perform one or more steps of the described methods.

In some embodiments of the present disclosure, instructions 1016 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 1000. For example, the non-transitory computer-readable medium may be one of memory device(s) 1012, as shown in FIG. 10, with instructions 1016 being stored within memory device(s) 1012. In some cases, the non-transitory computer-readable medium may be separate from computer system 1000. In one example, the non-transitory computer-readable medium may be a removable media provided to input device(s) 1006, such as those described in reference to input device(s) 1006, as shown in FIG. 10, with instructions 1016 being provided to input device(s) 1006. In another example, the non-transitory computer-readable medium may be a component of a remote electronic device, such as a mobile phone, that may wirelessly transmit a data signal carrying instructions 1016 to computer system 1000 using communications subsystem 1016, as shown in FIG. 10, with instructions 1016 being provided to communications subsystem 1010.

Instructions 1016 may take any suitable form to be read and/or executed by computer system 1000. For example, instructions 1016 may be source code (written in a human-readable programming language such as Java, C, C++, C #, Python), object code, assembly language, machine code, microcode, executable code, and/or the like. In one example, instructions 1016 are provided to computer system 1000 in the form of source code, and a compiler is used to translate instructions 1016 from source code to machine code, which may then be read into main memory 1014 for execution by processor(s) 1004. As another example, instructions 1016 are provided to computer system 1000 in the form of an executable file with machine code that may immediately be read into main memory 1014 for execution by processor(s) 1004. In various examples, instructions 1016 may be provided to computer system 1000 in encrypted or unencrypted form, compressed or uncompressed form, as an installation package or an initialization for a broader software deployment, among other possibilities.

In one aspect of the present disclosure, a system (e.g., computer system 1000) is provided to perform methods in accordance with various embodiments of the present disclosure. For example, some embodiments may include a system comprising one or more processors (e.g., processor(s) 1004) that are communicatively coupled to a non-transitory computer-readable medium (e.g., memory device(s) 1012 or main memory 1014). The non-transitory computer-readable medium may have instructions (e.g., instructions 1016) stored therein that, when executed by the one or more processors, cause the one or more processors to perform the methods described in the various embodiments.

In another aspect of the present disclosure, a computer-program product that includes instructions (e.g., instructions 1016) is provided to perform methods in accordance with various embodiments of the present disclosure. The computer-program product may be tangibly embodied in a non-transitory computer-readable medium (e.g., memory device(s) 1012 or main memory 1014). The instructions may be configured to cause one or more processors (e.g., processor(s) 1004) to perform the methods described in the various embodiments.

In another aspect of the present disclosure, a non-transitory computer-readable medium (e.g., memory device(s) 1012 or main memory 1014) is provided. The non-transitory computer-readable medium may have instructions (e.g., instructions 1016) stored therein that, when executed by one or more processors (e.g., processor(s) 1004), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method of evaluating a classifier model, the computer-implemented method comprising:
   providing the classifier model with a set of elements to be classified into N classes, wherein N is a number greater than or equal to two;
   obtaining results from the classifier model based on the classifier model classifying the set of elements into the N classes;
   computing N class-specific precisions and N class-specific recalls for the N classes based on the results;
   obtaining, for each of the N classes, a class-specific precision weight and a class-specific recall weight, wherein one or both of N class-specific precision weights or N class-specific recall weights obtained for the N classes are nonuniform; and
   computing a weighted f-measure value by weighting, as part of the weighted f-measure value, the N class-specific precisions with the N class-specific precision weights and weighting, as part of the weighted f-measure value, the N class-specific recalls with the N class-specific recall weights.

2. The computer-implemented method of claim 1, wherein N is greater than or equal to three.

3. The computer-implemented method of claim 1, wherein computing the N class-specific precisions and the N class-specific recalls for the N classes based on the results includes:
   counting a number of true positives in the results;
   counting a number of false positives in the results; and
   counting a number of false negatives in the results.

4. The computer-implemented method of claim 1, wherein each of the N class-specific precision weights and each of the N class-specific recall weights is greater than or equal to one.

5. The computer-implemented method of claim 1, wherein the set of elements include text, image, video, or audio data elements.

6. The computer-implemented method of claim 1, wherein the classifier model is a machine learning (ML) model.

7. The computer-implemented method of claim 6, wherein the classifier model is a long short-term memory (LSTM) network.

8. A non-transitory computer-readable medium comprising instructions that, when executed by one or more processors, cause the one or more processors to perform operations comprising:
   providing a classifier model with a set of elements to be classified into N classes, wherein N is a number greater than or equal to two;
   obtaining results from the classifier model based on the classifier model classifying the set of elements into the N classes;
   computing N class-specific precisions and N class-specific recalls for the N classes based on the results;
   obtaining, for each of the N classes, a class-specific precision weight and a class-specific recall weight, wherein one or both of N class-specific precision weights or N class-specific recall weights obtained for the N classes are nonuniform; and
   computing a weighted f-measure value by weighting, as part of the weighted f-measure value, the N class-specific precisions with the N class-specific precision weights and weighting, as part of the weighted f-measure value, the N class-specific recalls with the N class-specific recall weights.

9. The non-transitory computer-readable medium of claim 8, wherein N is greater than or equal to three.

10. The non-transitory computer-readable medium of claim 8, wherein computing the N class-specific precisions and the N class-specific recalls for the N classes based on the results includes:
    counting a number of true positives in the results;
    counting a number of false positives in the results; and
    counting a number of false negatives in the results.

11. The non-transitory computer-readable medium of claim 8, wherein each of the N class-specific precision weights and each of the N class-specific recall weights is greater than or equal to one.

12. The non-transitory computer-readable medium of claim 8, wherein the set of elements include text, image, video, or audio data elements.

13. The non-transitory computer-readable medium of claim 8, wherein the classifier model is a machine learning (ML) model.

14. The non-transitory computer-readable medium of claim 13, wherein the classifier model is a long short-term memory (LSTM) network.

15. A system comprising:
    one or more processors; and
    a computer-readable medium comprising instructions that, when executed by the one or more processors, cause the one or more processors to perform operations comprising:
    providing a classifier model with a set of elements to be classified into N classes, wherein N is a number greater than or equal to two;
    obtaining results from the classifier model based on the classifier model classifying the set of elements into the N classes;
    computing N class-specific precisions and N class-specific recalls for the N classes based on the results;
    obtaining, for each of the N classes, a class-specific precision weight and a class-specific recall weight, wherein one or both of N class-specific precision weights or N class-specific recall weights obtained for the N classes are nonuniform; and
    computing a weighted f-measure value by weighting, as part of the weighted f-measure value, the N class-specific precisions with the N class-specific precision weights and weighting, as part of the weighted f-measure value, the N class-specific recalls with the N class-specific recall weights.

16. The system of claim 15, wherein N is greater than or equal to three.

17. The system of claim 15, wherein computing the N class-specific precisions and the N class-specific recalls for the N classes based on the results includes:
    counting a number of true positives in the results;
    counting a number of false positives in the results; and
    counting a number of false negatives in the results.

18. The system of claim 15, wherein each of the N class-specific precision weights and each of the N class-specific recall weights is greater than or equal to one.

19. The system of claim 15, wherein the set of elements include text, image, video, or audio data elements.

20. The system of claim 15, wherein the classifier model is a machine learning (ML) model.

* * * * *